3,011,877

PRODUCTION OF HIGH-PURITY SEMICONDUCTOR MATERIALS FOR ELECTRICAL PURPOSES

Hans Schweickert, Erlangen, Konrad Reuschel, Pretzfeld, and Heinrich Gutsche, Erlangen, Germany, assignors to Siemens-Schuckertwerke Aktiengesellschaft, Berlin-Siemensstadt, Germany, a corporation of Germany Filed June 11, 1957, Ser. No. 665,086
Claims priority, application Germany June 25, 1956
13 Claims. (Cl. 23—284)

Our invention relates to the production of semiconductor materials, such as silicon or germanium, of highest purity for electrical purposes, such as for use in monocrystalline form in rectifiers, transistors, thermistors and other electrical semiconductor devices.

It is known to precipitate silicon from the gaseous phase by passing a gaseous mixture of hydrogen and silicon tetrachloride or silico-chloroform over a heated carrier, particularly a strip of tantalum. Silicon precipitates onto the tantalum strip on which it forms a covering crust of small thickness. The process is performed in an upwardly closed quartz cylinder whose open bottom end is sealed by a base plate. The base plate is traversed by electrodes which are connected exteriorly to the two poles of a voltage source, the ends of the tantalum strip being fastened to the electrodes in the interior of the quartz cylinder. Mounted between the electrodes in the cylinder is a supporting rod of silica extending parallel to the cylinder axis up to the vicinity of the closed top end. The middle of the tantalum strip rests upon the free end of the supporting rod so that the strip extends between the two electrodes in U-shaped configuration along the longitudinal direction of the cylinder. A pipe for the supply of fresh gas passes through the base plate into the interior of the cylinder and also extends nearly up to the other end.

For further processing of the product obtained with the aid of such a device, it is first necessary to remove the tantalum core from the silicon crust because otherwise the subsequent heat treatment, preferably zone melting, of the silicon would result in the formation of an alloy instead of a pure silicon monocrystal. The removal of the tantalum requires several intricate operations which entail the danger of introducing new impurities. Another disadvantage of the known device and method is the fact that the supporting silica rod, located between the two legs of the glowing tantalum strip, becomes heated up to approximately the same high temperature and hence is also coated with a silicon layer for which there is no further use.

If an attempt is made to substitute a silicon filament for the tantalum strip, to serve as a carrier for the crust to be precipitated, the filament, being fragile, tends to melt off during the first heating period. Difficulties arise if an attempt is made to mount, in the reaction vessel, a thin silicon rod. Since such a rod cannot readily be bent to U-shape, the supply of the electric heating current requires cumbersome and very large equipment because the current terminals must be located at a great distance from each other at the two opposite ends of the reaction vessel. This also causes difficulties when inserting and removing the charges.

It is an object of our invention to produce high-purity semiconductor materials in a greatly simplified, more convenient and more reliable manner.

To this end, and in accordance with a feature of our invention, we employ a method basically similar to the one described above in producing high-purity semiconductor material for electrical purposes, particularly silicon, by precipitating the semiconductor material from the gaseous phase onto a solid carrier heated by electric current. However, in distinction over the methods heretofore available, we use several carriers of the same semiconductor material as the one to be precipitated and make these carriers rod-shaped and sufficiently strong to be self-supporting. We further fasten one end of each carrier to a base structure and connect the fastened end of each rod to a pole of an electric current source, and we electrically interconnect the other ends of the rods so that current will pass serially from one or more rods through the interconnected ends and through the other rod or rods. The invention is suitable for producing high-purity silicon, germanium and other semiconductor substances having a diamond-like crystalline grid structure. The semiconductor rods so produced can be further purified, for instance by repeated crucible-free zone melting, and can be converted into monocrystals suitable for the production of monocrystalline semiconductor members with asymmetrically conducting p-n junctions for the manufacture of diodes or triodes for communication (low-current) or power (high-current) purposes.

Two devices according to the invention are illustrated on the drawings by way of example, FIGS. 1 to 4 relating to the first embodiment and FIGS. 5 to 7 to the second embodiment. The figures are more particularly described as follows.

Figure 3:
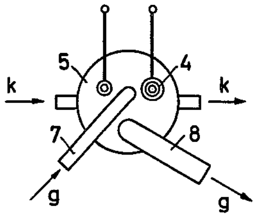
Figure 4:
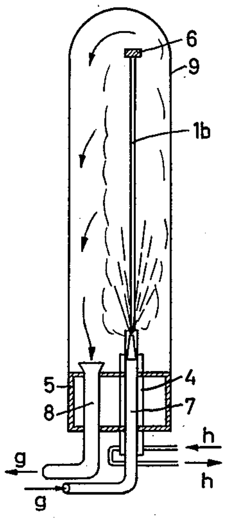
Figure 5:
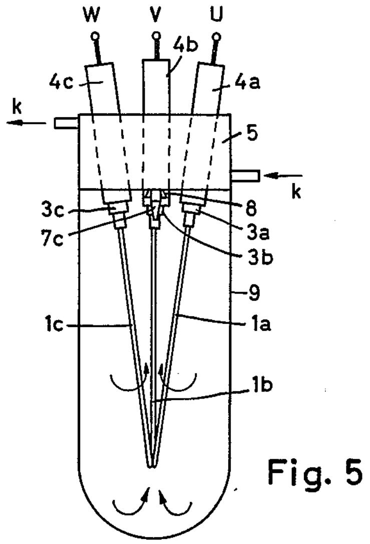
Figure 6:
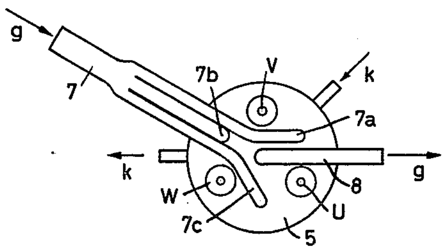

FIG. 3 a bottom view of the base portion;

FIG. 4 a partly sectional side view of the processing device;

FIG. 5 is a front view of a processing device according to the second embodiment;

FIG. 6 a top view; and

Figure 7:
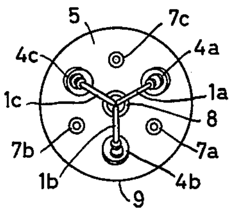

FIG. 7 is a bottom view of the base portion.

In the embodiment illustrated in FIGS. 1 to 4 the carrier rods or rod portions extend upwardly from the supporting base, whereas in the embodiment of FIGS. 5 to 7 the carrier rods are suspended from the base. Such a substantially vertical, or sharply inclined, arrangement of the rods has been found particularly favorable with respect to the design and use of the equipment. However, the method can also be carried out with the rods arranged in a horizontal or a less sharply inclined position. Similar components are denoted by the same respective reference characters in both groups of illustrations.

Figure 1:
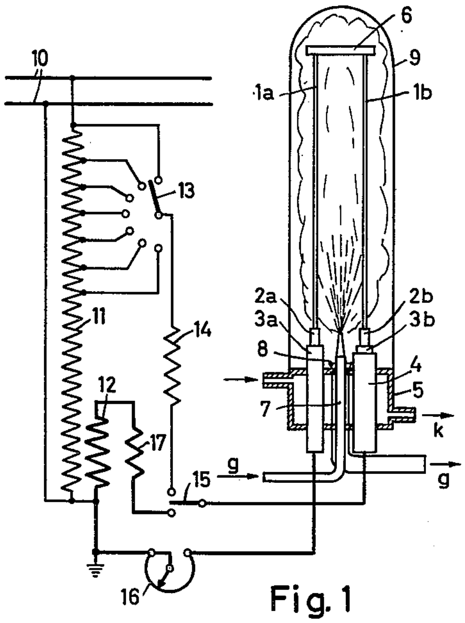
FIG. 1 shows an electric circuit diagram and illustrates, in a partly sectional front view, the processing device proper.

In FIG 1 two thin silicon rods or rod sections or portions are denoted by 1*a* and 1*b*. The rods 1*a* and 1*b* may have a lenght of 0.5 m. and a diameter of 3 mm. Such rods remain self-supporting even in incandescent condition, such as at a temperature of 1100 to 1200° C. The lower ends of the silicon rods 1*a* and 1*b* are inserted into respective holders 2*a* and 2*b* preferably consisting of graphite of highest purity, particularly the so-called "spectral carbon." Spectral carbon is obtainable in commerce in the form of rods of circular cross section and is normally used as electrodes for producing an arc for spectral analyses. Short pieces of such spectral carbon are provided at one front face with a slightly conical bore into which the end of a silicon rod can be pushed to firmly seat the rod in the holder. The holders may also be designed as clamps. For this purpose the graphite rod at its bored end may be split in half over a suitable axial length, one half remaining firmly joined with the body of the graphite rod whereas the other is severed from the rod by means of an incision perpendicular to the rod axis. The two halves, namely the fixed half and the loose half, form respective clamping jaws which are held together by a graphite ring, after the end of the silicon rod has been clamped between them.

Graphite holders 2*a* and 2*b* are pushed, in part, into metal pipes 3*a* and 3*b*, being firmly seated therein. The metal pipes are gas-tightly sealed in a common base structure 5, which may likewise consist of metal and is preferably made hollow, and is provided with stub pipes for the supply and discharge of a coolant such as water. The flow of coolant is indicated by arrows *k*. The metal pipe 3*a* may be directly soldered to the metallic base structure 5. This requires the insulating of the other metal pipe 3*b* by means of a sleeve 4 of electrically non-conducting material relative to the metallic base structure 5. The insulating sleeve 4 may consist, for example, of glass, porcelain or other ceramics, or of plastics. The metal pipes 3*a* and 3*b* must be gas-tightly sealed by a transverse wall or by a stopper, somewhere within the interior of the pipes, or at their lower end.

The silicon rods 1*a* and 1*b* may also be directly clamped in the respective metal pipes 3*a* and 3*b*, thus eliminating the carbon clamps or holders 2*a* and 2*b*. This, however, requires giving the silicon rod at the clamping ends a larger cross section than elsewhere, so that these clamping locations are not as strongly heated during the heat processing as the thinner rod portions.

The carrier rods 1*a* and 1*b* extend parallel to each other so that their free ends do not touch. These ends are conductively connected with each other by a bridge 6 of high-purity graphite. This bridge 6 also consists preferably of spectral carbon. It may be provided with bores engaging the upper ends of the respective rods 1*a* and 1*b*.

The base structure 5 also accommodates an inlet pipe 7 for the gaseous reaction mixture from which the semiconductor material is precipitated. The upper end of the inlet tubes 7 is nozzle shaped, and causes the fresh gas mixture to enter into the reaction space in turbulent flow as a free jet. During the precipitating process the nozzle must not be heated up to the reaction temperature. This is necessary in order to prevent the reaction from taking place within the nozzle, which would have the result that silicon deposited at the inner nozzle walls would narrow, or even clog, the nozzle opening. The tip of the nozzle is therefore mounted below the upper ends of the carbon holders 2*a* and 2*b*. The jet of gas travels from the fastening points of the carrier rods in the longitudinal direction of the rods. The inlet pressure of the fresh gas mixture can be so adjusted that the rods 1*a* and 1*b* are flooded with fresh gas along their entire length. The gas leads through an outlet tube 8 which is likewise inserted into the base structure 5 and is gas-tightly sealed relative thereto. The gas inlet and the gas outlet are identified in FIG. 3 by arrows *g*. A transparent bell 9 of glass or quartz is gas-tightly sealed and fastened on the base structure 5, and encloses the reaction space.

The electric leads for supplying the heating current are connected to the metal pipes 3*a* and 3*b*. Since the silicon rods 1*a* and 1*b* have a very high electric resistance when cold, amounting to a multiple of the resistance in incandescent condition, there are preferably provided two sources of heating current. One is for high voltage to produce heating at low current intensity. The second is a source of low voltage for continuous operation at high current intensity during the depositing process proper. Accordingly, FIG. 1 shows a high-voltage line 10 to which the primary winding 11 of a transformer is connected. A controllable voltage can be taken from the primary winding 11 by means of taps and a selector switch 13. The tapped-off voltage can be controllably applied to the metal tube 3*b*, during the heating-up period, by means of the selector switch 13 which is in series with a stabilizing impedance 14 and a switch 15. The metal pipe 3*a* is connected through a control rheostat 16 with the grounded end of the transformer winding 11. During the heating-up period the voltage can be varied by means of the selector switch 13 in such manner that the heating current does not become larger than two amperes. When the silicon rods have reached glowing red condition, the voltage is reduced by means of switch 13 so that the switch 15 can be switched over to supply voltage from the secondary transformer winding 12, which is rated for low voltage and high current intensity. For stabilization, the low-voltage circuit of winding 12 is provided with an impedance 17. By means of the control rheostat 16 the current is increased until the silicon rods 1*a* and 1*b* have reached a temperature of about 1150° C., which has been found to be most favorable for the performance and economy of the process. The temperature is indicated by the glowing color of the rods and is kept constant for the duration of the process. This requires a continuous and gradual increase of the current, regulated by means of rheostat 16, due to the fact that the resistance of the rods decreases with increasing thickness.

Figure 2:
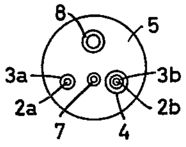
FIG. 2 is a top view of the base portion of the processing device.

The arrangement of the rod holders, the gas inlet and the gas outlet are apparent from FIG. 2. The path of the gas flow within the reaction space is schematically indicated in FIG. 4 by curved arrows. Also shown in FIG. 4 and denoted by arrows *h* is a coolant circulation for the insulated metal pipe 3*b*. The interior of pipe 3*b* is traversed by a flow of coolant, water for example, which passes through insulating tubing, comprising glass tubes and hoses of insulating material. The insulation of the coolant circulation system must either be sufficient for the high voltage used during the heating-up period, or care must be taken that the coolant circulation system is inactive during the heating-up period and safety devices provided so that it can be made active only during continuous processing with low voltage.

Instead of providing a single pair of rods, any desired larger number of rods, even or odd, may be arranged within a single reaction space. While in the illustrated example the electric heating current passes serially through the two rods, any desired number of rods may be connected in parallel to a single pole of the heating circuit, and the numbers of rods thus parallel connected to a single pole may differ from the number of rods connected to the other pole. Depending upon the number of rods to be processed simultaneously, the bridge member 6 may have lateral arms or may be given a cross- or star-shaped design, preferably so disposed that the ends touch the walls of the bell 9 in order to brace the upper rod ends in lateral direction.

The device illustrated in FIGS. 5 to 7 is provided with three carrier rods or rod portions 1*a*, 1*b*, 1*c* suitable for connection to three-phase alternating current supplied to the terminals U, V, W. The connecting pipes 3*a*, 3*b*, 3*c* are all surrounded by respective insulating jackets 4*a*, 4*b*, 4*c* and are inserted into a common metallic base structure 5 in such a manner that the carrier rods 1*a*, 1*b*, 1*c* are suspended downwardly and are inclined towards each other to make their free ends touch each other. This makes it unnecessary to provide a separate current-conducting connection since the rods or rod portions, during the heating-up operation, will fuse together at the point of mutual contact. As is apparent from the top view, FIG. 6, and the bottom view, FIG. 7, of the base structure 5, this device is provided with three inlet pipes 7*a*, 7*b*, 7*c* for the fresh gas. The inlet nozzles are uniformly distributed, on the periphery of a circle, between the rod holders. The gas outlet pipe 8 passes through the base structure 5 on the center axis of the device, so that the arrangement within the bell 9 is completely symmetrical. The path of the gas flow is indicated in FIG. 5 by curved arrows.

As indicated above, when germanium or other material is to be precipitated, the silicon rods can be replaced by rods of germanium or such other material. To produce germanium of highest purity, there may be used, for example, germanium tetrachloride ($GeCl_4$) in gaseous condition as a starting substance, employing hydrogen as carrier gas and reduction agent. In this case the reaction temperature is preferably in the range between 700 and 800° C.

It is further understood that the gaseous mixture employed may be a mixture of hydrogen and silicon tetrachloride or silico-chloroform when silicon is being precipitated, or any other gas or gaseous mixture capable of reaction or decomposition to produce silicon.

It is further understood that the gas or gaseous mixture employed when germanium is being precipitated is any gas or gaseous mixture capable of reacting or decomposing to precipitate germanium.

Another example is the production of silicon carbide (SiC) from monomethyltrichlorsilane ($CH_3SiCl_3$), employing hydrogen as carrier gas and reducing agent. In this case the reaction temperature is preferably between 1300° and 1400° C. approximately. A carrier rod of silicon carbide is used in the latter case, produced from a thicker rod by sawing it parallel to the rod axis. At the higher melting temperature of silicon carbide there occurs a dissociation into the components, the silicon being evaporated out of the material. However, the carrier rod may also consist of pure carbon. This carbon core can later be removed by mechanical means, if necessary. Also suitable as starting materials for the production of silicon carbide are mixtures of silicon-halogen compounds with hydrocarbons, an addition of hydrogen gas being employed as carrier gas and reducing agent. As examples, we employ the mixtures:

$$(SiCl_3H+C_6H_{12})+H_2$$

or $$(SiCl_3H+CCl_3H)+H_2$$

The most favorable reaction temperatures are between the approximate limits of 1300 and 1400° C.

Essential for the economy of the method is the proper choice of the molar ratio MV, which is defined as the number of moles of the compound containing the semiconductor substance, with respect to the number of moles of the hydrogen being used. This molar ratio is to be chosen differently for different mixtures of substances. When producing silicon from $SiCl_3H$, this ratio is between 0.015 and 0.3, preferably between 0.03 and 0.15.

If these limits are observed, an excessive hydrogen consumption on the one hand, and an excessive consumption of $SiCl_3H$ on the other hand, are avoided. Within the above-mentioned narrower range, there is achieved a yield of silicon between 40% and 20%, calculated in relation to the total quantity of silicon contained in the starting substances.

When producing silicon from $SiCl_4$, the molar ratios are preferably chosen between 0.01 and 0.2, with particular preference to the range between 0.015 and 0.10. In this medium range a production of silicon between about 30% and about 8% is obtainable.

For the production of germanium from $GeCl_4$, the molar ratio is advantageously chosen in the range between 0.1 and 0.4, preferably approximately 0.2. In this case a production of germanium up to 90% is obtainable.

The term decomposition is used in the generic sense, being inclusive of reduction and dissociation.

It will be obvious to those skilled in the art, upon a study of this disclosure, that processing devices according to the invention can be modified in various ways and may be embodied in equipment other than particularly illustrated and described herein, without departing from the essential features of our invention and within the scope of the claims annexed hereto.

We claim:

1. An apparatus for producing semiconductor material of high purity for electrical purposes, comprising a closed vessel having inlet and outlet means for supplying a gaseous compound of said semiconductor material which precipitates semiconductor material upon heating, a base structure having electrically conductive and mutually insulated holding means comprising holders, a plurality of elongated carrier rod portions of self-supporting strength and consisting of the same semiconductor substance as that to be precipitated, each of said rod portions having only one of its ends mounted on one of said holders respectively, the other ends of said rod portions extending into the interior of the vessel and being conductively connected with each other to form together a free self-supported interior carrier structure, electric current supply means connected across said holders to heat said rod portions to a temperature below the melting point but sufficient to precipitate said semiconductor material on the rods, said inlet and outlet means being located adjacent the same end region of the rods, so that the gaseous compound reverses direction in passing from the inlet to the outlet.

2. The apparatus described in claim 1, in which the holders for the carrier rod portions consist of high-purity spectroscopic carbon.

3. The apparatus described in claim 1, in which the free ends of the carrier rod portions do not touch each other, being electrically interconnected by a bridge of carbon material of high purity.

4. The apparatus described in claim 1, the rod portions being at least three in number, and polyphase circuit means connected to the rod portions.

5. The apparatus described in claim 1, in which the carrier rod portions are of germanium.

6. The apparatus described in claim 1, the rod portions being at least three in number, symmetrically disposed in a circle, the inlet means for supplying the gaseous compound comprising individual jet nozzles symmetrically disposed between the rod portions, the tips of each of the jets being closer to the base structure than the ends of the carrier rod portions in said holders.

7. An apparatus for producing semiconductor material of high purity by decomposition of a gaseous compound of the material, comprising a closed vessel, at least one elongated semiconductor rod composed of said material therein capable of being heated to an elevated temperature to effect decomposition of the gaseous compound and to deposit semiconductor material on the member, inlet means for introducing the gaseous compound into the closed vessel, said inlet means comprising a nozzle for introducing the gaseous compound as a high velocity jet into the interior of the vessel whereby a high degree of turbulence of the gaseous compound is caused to occur within the vessel to effect efficient decomposition of the compound and deposition of the semiconductor material on the rod, and outlet means for venting gaseous residue, the mouth of the nozzle being mounted in the vicinity of an end of said rod and being so directed that the gaseous compound is blown in the longitudinal direction of the rod, and electrical circuit means connected to the rod to pass current through the rod to heat it to effect said decomposition.

8. An apparatus for producing semiconductor material of high purity by decomposition of a gaseous compound of said material, comprising a closed vessel, at least one elongated semiconductor rod composed of said material therein capable of being heated to an elevated temperature to effect decomposition of the gaseous compound and to deposit semiconductor material on the member, inlet means for introducing the gaseous compound to the closed vessel, said inlet means comprising a nozzle for introducing the gaseous compound as a high velocity jet into the interior of the vessel whereby a high degree of turbulence of the gaseous compound is caused to occur within the vessel to effect efficient decomposition of the compound and deposition of the semiconductor material on the rod, and outlet means for venting gaseous residue, the mouth of the nozzle being mounted in the vicinity of an end region of said rod and being so directed that the gaseous compound is blown in the longitudinal direction of the rod, said outlet means being in the same region of the vessel as said inlet means, and electrical circuit means connected to the rod to pass current through the rod to heat it to effect said decomposition.

9. The apparatus defined in claim 8, said material being silicon, the electric circuit means heating the silicon rod to a temperature below its melting point but at least to glowing temperature.

10. An apparatus for producing semiconductor material of high purity for electrical purposes, comprising a closed vessel having inlet and outlet means for supplying a gaseous compound of said semiconductor material which precipitates semiconductor material upon heating, a base structure having electrically conductive and mutually insulated holding means comprising holders, a plurality of elongated carrier rod portions of self-supporting strength and consisting of the same semiconductor substance as that to be precipitated, each of said rod portions having only one of its ends mounted on one of said holders respectively, the other ends of said rod portions extending into the interior of the vessel and being conductively connected solely with each other to form together a free self-supported interior carrier structure, electric current supply means connected across said holders to heat said rod portions to a temperature below the rod melting point but sufficient to precipitate said semiconductor material on the rods, the inlet and outlet means for the gaseous compound comprising conduits mounted on the base structure, the inlet conduit being nozzle-shaped and directing the incoming gas mixture flowing as a free jet from the mounting location of the carrier rod portions longitudinally along the rod portions.

11. An apparatus for producing silicon of high purity, comprising a closed vessel having inlet and outlet means for supplying a gaseous compound of silicon which precipitates silicon upon heating, a base structure having electrically conductive and mutually insulated holding means comprising holders, a plurality of elongated carrier rod portions of silicon and self-supporting strength, each of said rod portions having only one of its ends mounted on one of said holders respectively, the other ends of said rod portions protruding into the interior of the vessel and being conductively connected solely with each other to form together a free self-supported interior carrier structure, electric current supply means connected across said holders to heat said rod portions to a temperature below the melting point but sufficient to precipitate said silicon on the rods, said inlet and outlet means being located adjacent the same end region of the rods, so that the gaseous compound reverses direction in passing from the inlet to the outlet.

12. An apparatus for producing semiconductor material of high purity for electrical purposes, comprising a closed vessel having inlet and outlet means for supplying a gaseous compound of said semiconductor material which precipitates semiconductor material upon heating, a lower base structure having electrically conductive and mutually insulated holding means comprising holders, a plurality of elongated carrier rod portions of self-supporting strength and consisting of the same semiconductor substance as that to be precipitated, each of said rod portions having only one of its ends mounted on one of said holders respectively, the rod portions extending upwardly into the interior of the vessel, the end regions thereof being conductively connected solely with each other to form together a free self-supported interior carrier structure, electric current supply means connected across said holders to heat said rod portions to a temperature below the melting point but sufficient to precipitate said semiconductor material on the rods, said inlet and outlet means being located adjacent the same end region of the rods, the inlet being directed in a direction lengthwise of the rods, so that the gaseous compound reverses direction in passing from the inlet to the outlet.

13. The apparatus defined in claim 7, said semiconductor material being silicon, the electric current means heating the silicon rod to a temperature below its melting point but at least to glowing temperature.

References Cited in the file of this patent

UNITED STATES PATENTS

| | | |
|---|---|---|
| 1,019,394 | Weintraub | Mar. 5, 1912 |
| 1,500,789 | Aoyagi | July 8, 1924 |
| 1,601,931 | Van Arkel | Oct. 5, 1926 |
| 1,710,747 | Smith | Apr. 30, 1929 |
| 2,325,521 | Lambert | July 27, 1943 |
| 2,438,892 | Becker | Apr. 6, 1948 |
| 2,441,603 | Storks et al. | May 18, 1948 |
| 2,551,341 | Scheer et al. | May 1, 1951 |
| 2,660,540 | Karash et al. | Nov. 24, 1953 |
| 2,713,702 | Jewell | July 26, 1955 |
| 2,739,566 | Shapiro et al. | Mar. 27, 1956 |
| 2,763,581 | Freedman | Sept. 18, 1956 |

FOREIGN PATENTS

| | | |
|---|---|---|
| 736,852 | Great Britain | Sept. 14, 1955 |
| 745,698 | Great Britain | Feb. 29, 1956 |

OTHER REFERENCES

Kroll et al.: Metal Industry, Oct. 18, 1946, pages 319–321.